US006469717B1

(12) United States Patent
Wineke et al.

(10) Patent No.: US 6,469,717 B1
(45) Date of Patent: Oct. 22, 2002

(54) COMPUTERIZED APPARATUS AND METHOD FOR DISPLAYING X-RAYS AND THE LIKE FOR RADIOLOGICAL ANALYSIS INCLUDING IMAGE SHIFT

(75) Inventors: Steven Glenn Wineke, Windsor Mill, MD (US); Valmore Wilhelm Albrecht, Manassas, VA (US)

(73) Assignee: Dejarnette Research Systems, Inc., Towson, MD (US)

( * ) Notice: Subject to any disclaimer, the term of this patent is extended or adjusted under 35 U.S.C. 154(b) by 0 days.

(21) Appl. No.: 09/428,194

(22) Filed: Oct. 27, 1999

(51) Int. Cl.[7] .................................................. G09G 5/00
(52) U.S. Cl. ...................................... 345/788; 345/765
(58) Field of Search ................................. 345/788, 765, 345/764, 762, 424, 780, 778, 858, 817; 600/437, 425

(56) References Cited

U.S. PATENT DOCUMENTS

| 5,452,416 A | | 9/1995 | Hilton et al. ................ 345/424 |
|---|---|---|---|
| 5,644,611 A | * | 7/1997 | McShane et al. ............. 378/98 |
| 5,740,267 A | * | 4/1998 | Echerer et al. ............. 382/132 |
| 5,954,650 A | * | 9/1999 | Saito et al. ................ 600/425 |
| 5,986,662 A | * | 11/1999 | Argiro et al. ............... 345/424 |
| 6,063,030 A | * | 5/2000 | Vara et al. .................. 600/437 |
| 6,081,267 A | * | 6/2000 | Stockham et al. .......... 345/788 |

\* cited by examiner

*Primary Examiner*—Raymond J. Bayerl
*Assistant Examiner*—Tadesse Hailu
(74) *Attorney, Agent, or Firm*—Leonard Bloom; Robert M. Gamson

(57) ABSTRACT

A computer apparatus and method for displaying radiological data such as X-rays, CT scans and other similar anatomical sequences in combination with other modalities such as plane views provides functionality which very closely resembles a standard radiological light board. Basic manipulations which occur at the light board by a radiologist or other medical personnel are closely emulated in function to allow medical personnel to stay focused directly on the anatomical images and thereby avoid the distraction and frustration of visually departing from the image in order to accomplish these basic functions. A display monitor screen includes image containers, and a button to activate an image shift feature. When the image shift feature is activated, a technologist uses the mouse cursor to select an image. Then, with a convenient drag-and-drop operation, the technologist is able to switch the image with another image in the displayed study.

17 Claims, 3 Drawing Sheets

COMPUTERIZED APPARATUS AND METHOD FOR DISPLAYING X-RAYS AND THE LIKE FOR RADIOLOGICAL ANALYSIS INCLUDING IMAGE SHIFT

BACKGROUND OF THE INVENTION

1. Field of the Invention

This invention pertains to the field of radiology generally, and more specifically to an improved apparatus and method for displaying radiological information such as anatomical images in a manner closely emulating light boards, but having additional features and advantages available from computer image processing.

2. Description of the Related Art

In copending patent application Ser. No. 09/195,936 (which is assigned to the present assignee, and the entire contents of which are incorporated herein by reference) we disclose a computerized apparatus for displaying radiological images that provides a dark and stark appearance to maximize the image display region. Many functions are provided within that apparatus that emulate manual processes associated with film, rather than requiring extensive pull-down menuing and other obstacles commonly associated with computer systems. In most instances, the radiologist or technician must simply use the mouse to perform the functions that were being performed manually, and the system recognizes those functions. By implementing the functions to closely emulate manual actions, there is little need for additional training, and processes remain quite intuitive.

Radiologists have traditionally reviewed X-ray photographic images on light boards, sometimes also referred to as view boards. These photographic images may be directly formed onto appropriate film stock by illuminating an anatomical region with X-ray radiation and then developing the film. Once developed, the film may be displayed directly on a light board. A radiologist will manually manipulate the images, including flipping the images top to bottom and left to right and also rotating the images, without looking away from the image. This is done by grasping an edge of the image and either flipping the image over to form a mirror image thereof or by rotating the image clockwise or counterclockwise to view a rotated image. One image may be placed directly over another for visual comparison, and sequences are readily rearranged. Each of these manual actions is easy to perform and quite intuitive with the actual film stock. As a result, the film stock and light board is a very convenient and easy to use system, and most radiologists have grown accustomed to this existing system and procedure.

More recently, equipment has been developed which is capable of providing a radiologist and various other medical personnel with different views of the same physiology. Depending upon the symptoms a patient may present, imaging systems such as CT scans and/or MRI may be selected as appropriate diagnostic tools. Multiple images of sequential body sections may be generated, and duplicate sequences of the same body sections may be created with varying degrees of exposure intensity. By varying exposure intensity, a radiologist may be able to discern features from two contrasting sequences which might otherwise not be visible in either single sequence. These newer diagnostic imaging systems may generate electronic representations of the actual image, and these electronic signals may then be outputted to one or more media for viewing and storage. Often, even with electronic capability, the information from these newer diagnostic tools is outputted to transparencies for handling and review by the radiologist on the familiar light board.

Unfortunately, the radiologist loses some advantages that are inherent in the electronic system when the image is converted to "hard-copy" such as a transparency. Since the film stock is generally exposed at actual size, smaller details or features may be difficult to identify or interpret accurately. Images are not easily magnified to focus in on a particular feature, and special computer image processing features such as edge detect, sharpening and other techniques are unavailable. Furthermore, storage of images and sequences of images requires substantial filing space and expensive record archiving. Where a further review by other medical personnel is warranted, film stock is difficult to transmit and must be manually copied and delivered via a courier. The reviewing personnel are then also limited to views and magnification selected by the first reviewer. To further compound the challenges of hard-copy, many new diagnostic imaging systems are capable of generating hundreds of helpful, separate images in a single sequence. Handling the large quantities of images in hard-copy becomes quite cumbersome.

In an effort to circumvent the need for generating hard-copy, a number of computer systems have been developed which allow the radiologist to directly view the actual images for evaluation. These computer systems allow the radiologist to take advantage of a number of features available only through computer graphics presentation of the anatomical data, more commonly referred to as "soft-copy". Computer software is well known and widely available for performing a variety of image manipulation functions such as angular rotations, image flipping, edge detection, zooming or selective magnification, and sharpening. Unfortunately, much of the software was originally developed for use by graphic artists and others specializing in the development and manipulation of the content of images. In many cases, a radiologist does not need to create or substantially alter the image, but instead needs to be able to manipulate the image as easily and intuitively as possible. As a result of the differences between the way a graphic artist handles an image and the way a radiologist would handle the same image, many radiologists still prefer to work with film stock or computer generated transparencies and the traditional light board.

The prior art has disclosed various improvements which adapt the computer systems more specifically to the handling of anatomical data and for use by medical personnel, but these improvements are not completely satisfactory.

For example, Hilton et al in U.S. Pat. No. 5,452,416, incorporated herein by reference, proposes a multi-head workstation, meaning that more than one video display monitor is used to display radiological data. The system offers numerous features which are becoming more commonplace in radiological viewing systems, including database management, exam scheduling, fixed-site and mobile image input, case review, reporting, teleradiology, electronic delivery of images/reports (voice and text) to referring physicians' offices, printing, operation with LANs and WANs, integration with other information systems, automated image display based upon radiologists' individual preferences, automatic output based upon referring physicians' individual preferences, automated printing, and displaying of cines (cinematographic presentations of sequences of images).

Unfortunately, however, the Hilton et al system still requires a separate monitor on which a variety of menus and control icons are displayed. The additional monitor adds undesirable expense and desktop size to the system, but far more consequential than cost or space is the way a user must interface with the displays. For example, if when looking at an image, a radiologist identifies an area requiring more attention and wishes to put the image in different anatomical perspective, the radiologist must visually leave the area of interest, look at the separate monitor, find the necessary control to alter the image, and then return to the image on a different display screen. In leaving the radiological image, the radiologist is bound to lose track of the original area of interest and must locate the area once more. This can be a very frustrating waste of time, particular for those medical personnel who are accustomed to using the light boards and film negatives, where the film may be grasped and manipulated without ever visually leaving the area of interest. As a result, many medical personnel still use hard-copy and resort to soft-copy viewing stations only for special applications and requirements.

A number of other systems are cited in the Hilton et al patent, each of which are also incorporated herein by reference for their enablement of the standard and basic features and functions necessary to implement a computerized radiological display system. Moreover, a number of these systems are available commercially that illustrate similar basic functionality. Nevertheless, none of these systems illustrate or teach an apparatus or method which allows a user to truly emulate viewing film on a light board and still obtain additional benefits available only from soft-copy.

While the copending application referred to hereinabove provides great advances in allowing radiologists and others to emulate film handling in a film-less environment, especially by those who are not completely sophisticated in computer technology and software usage, the present inventors have learned that there are further needs in the radiology department that, as yet, have not been addressed.

More particularly, in a traditional environment where the radiology department uses film, technologists are often expected to present the films in the proper orientation and order for the radiologists. The radiologists can then make their diagnoses, after reviewing the film. For example, with a two-view chest film, including an AP chest and a lateral chest, radiologists usually prefer to have the AP chest on the left of the lateral chest. In a study such as an IVP that has multiple images taken at different times, radiologists usually want the films to be displayed in the correct timed order. While arranging film in the correct order is quite intuitive, rearrangement in a film-less environment has been lacking in workstations used and managed by technologists. This is so, even though it is more cost effective to have the technologists perform the appropriate arranging and orienting.

SUMMARY OF THE INVENTION

In a first manifestation of the invention, a computerized apparatus displays radiological anatomical images that vary in type and preferred display formats. The apparatus allows an operator to stay visually focused on a display monitor where the images are displayed, while also providing the operator with a maximum display area for the images. A display monitor screen includes a first graphical container and a second graphical container where first and second images may be displayed. A cursor indicates a pointer position on the display monitor screen, and the pointer position is variable and controlled by an operator input device. The screen includes a rearrange control region which responds to the pointer position and an additional operator input to activate a rearrange display. Once the rearrange display is activated, the cursor responds to an operator activation to select an image from the first graphical container. A second operator input drops the image into the second graphical container.

In a second manifestation, the invention also comprises a method for displaying and rearranging a variable number of radiological images on a computer screen. A user may directly activate common functions and capabilities without accessing additional screen pages or pull down menus, and images may be shifted from a first viewing order to a second order for subsequent viewing sessions. The method comprises the steps of: defining an image display region; displaying a first image within the image display region; presenting a rearrangement button on the screen; indicating a cursor position; monitoring a cursor control input device for changes in cursor position; calculating cursor position; determining whether cursor position and button overlap; monitoring for a signal indicative of cursor activation; displaying a second image display region; and enabling a drag-and-drop movement of the first image from first display region to second display region, subsequent to overlap and cursor activation.

In a third manifestation, the invention is a radiological image display apparatus which closely emulates actions required of a technologist in arranging film images on a view board. The display screen and image repository icon means emulate placement of film onto an empty view board. A plurality of radiological image containers provide a display of the stored image sequence in a first sequential pattern. A selection button within the display screen enables a cursor image sequence rearrangement function while simultaneously disabling other cursor control functions. The rearrangement function processes the stored image sequence to generate a second, different sequential image pattern. The stored image sequence may be readily rearranged within each of the plurality of image containers while not disturbing or altering other image functions, until the cursor image sequence rearrangement function has been completed. The display apparatus closely emulates a film exposure and manipulation thereof on a light board by medical personnel.

OBJECTS OF THE INVENTION

Accordingly, it is a basic object of the present invention to provide a simple and cost-effective method of rearranging images, in combination with a computer apparatus and method for displaying radiological data, one which emulates the functions and preserves the advantages of traditional film and view boards yet allows a radiologist, technologist or other medical personnel to remain focused on an image while still performing basic functions.

These and other objects of the invention are achieved in the preferred embodiment, which offers significant advantage over prior art systems.

DESCRIPTION OF THE PREFERRED EMBODIMENT

Figure 1:
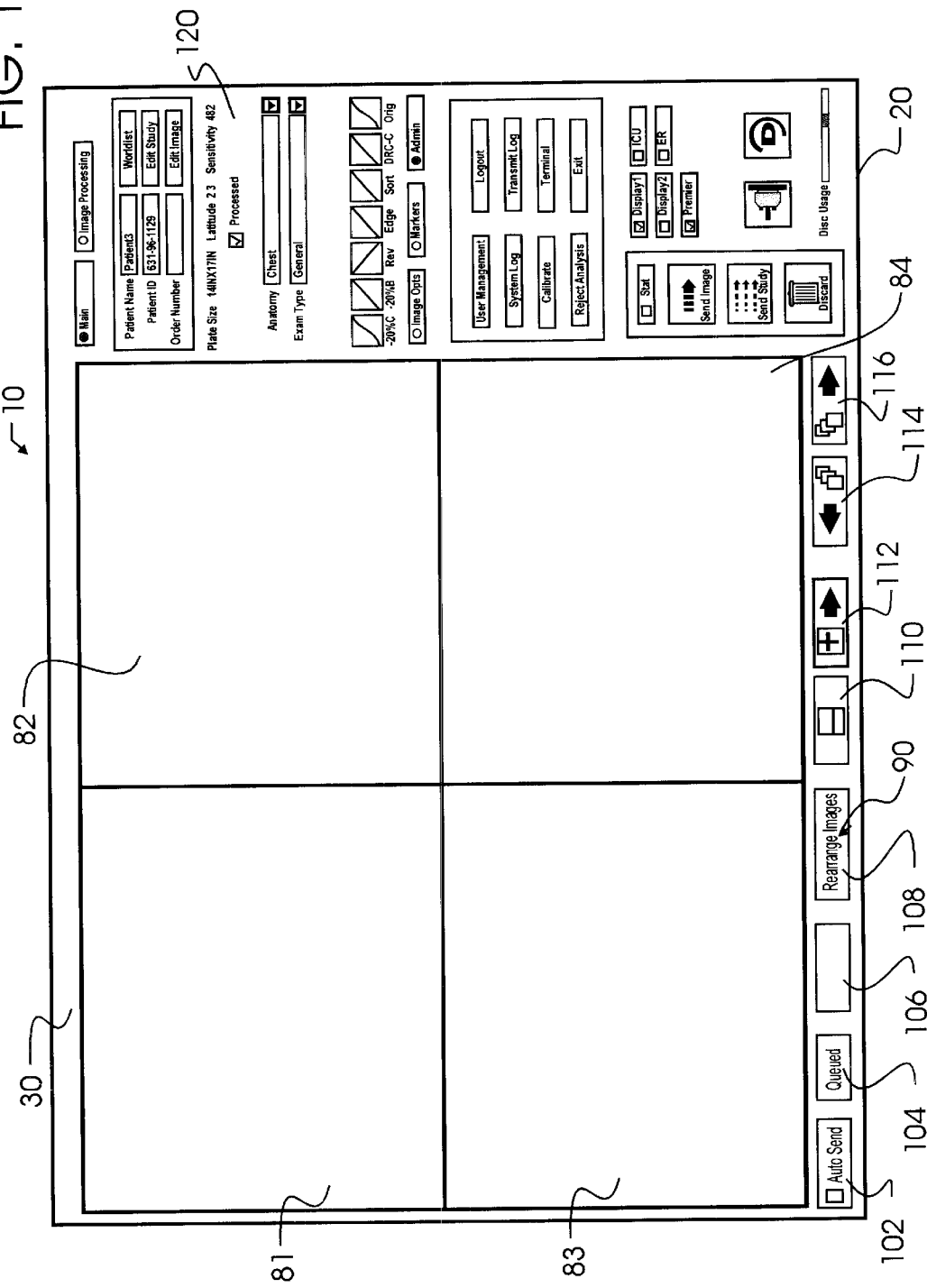
FIG. 1 illustrates a preferred embodiment of the apparatus of the present invention, one having the capability to rearrange images.

A preferred embodiment computerized apparatus for displaying radiological images in accord with the present invention is shown generally as apparatus 10 in FIG. 1. Apparatus 10 includes a display monitor 20 having a display screen 30 therein. The image shift feature is illustrated through a rearrange images button 108, which is one of the action buttons 102–118 that are provided at the bottom of display screen 30. For this illustration, four display containers 81–84 are illustrated. While in FIG. 1 these display containers 81–84 are empty, in actual practice these containers would most frequently contain radiological images. Among the other action buttons 102–118, are a single image forward button 112 and a single image backward button 110, which together provide image-by-image navigation through a radiological collection. An information and control panel 120 may also be provided, and can include various bibliographic identifying information, such as the patient, image type, and so forth. As shown in FIG. 1, cursor 90 is positioned over rearrange images button 108, and the mouse or other input device (not shown) will be activated to "click" button 108.

Figure 2A:
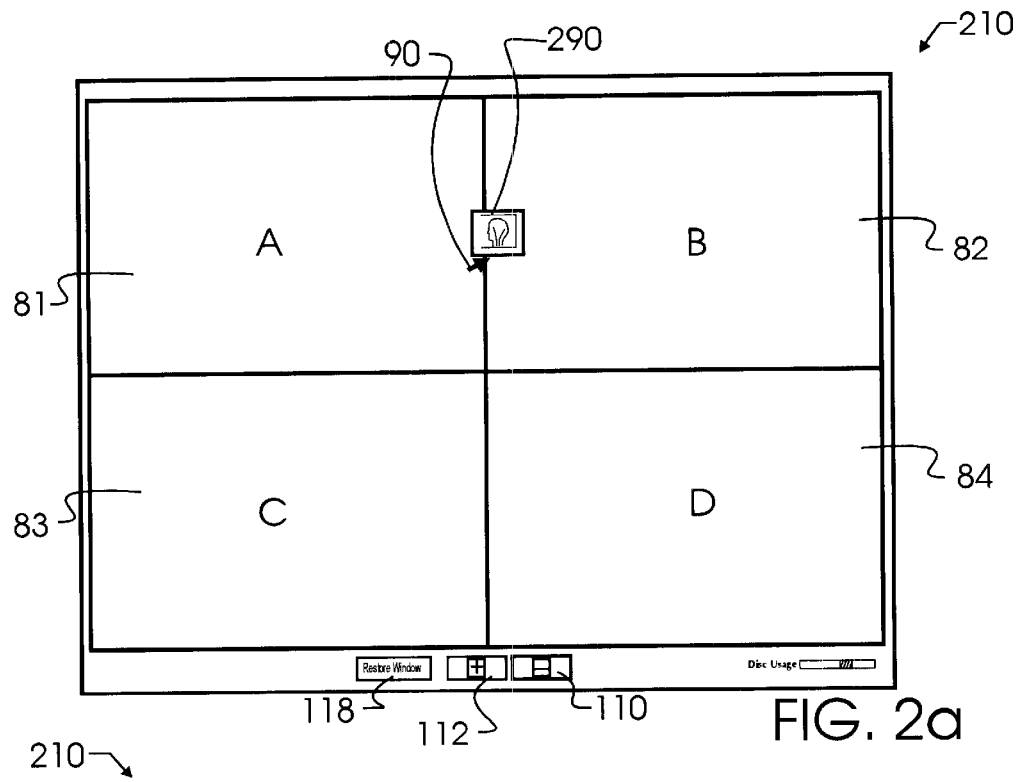
FIGS. 2a and 2b illustrate the preferred embodiment apparatus during sequential steps of the rearrangement method in accord with the teachings of the present invention.
Figure 2B:
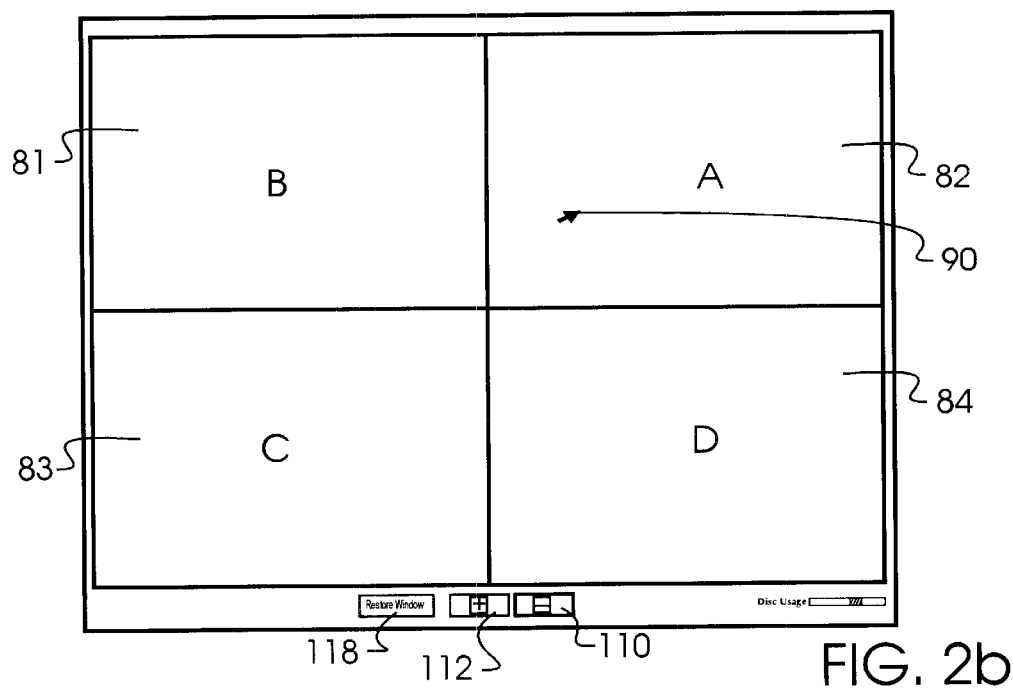

In response to clicking rearrange button 108, a rearrange display 210 shown in FIGS. 2a and 2b is opened on display screen 30. Display containers 81–84 are illustrated as containing the respective letters A, B, C, and D for illustration purposes, though once again, these display containers 81–84 will generally contain radiological images. These images now consume nearly the entire screen 30, ensuring the maximum visibility of image features. The visual clutter of unnecessary controls is alleviated. However, single image backward and forward buttons 110 and 112, respectively, remain visible at the bottom of screen 30. These buttons 110, 112 are used by the technologist or other medical personnel to move forward or backward through a radiological file, until the images which need to be rearranged are displayed. While in the drawings four images are illustrated, it will be apparent to one of ordinary skill in the art, that from the balance of this disclosure more or fewer images may be displayed, though four is most preferred to balance image size against the amount of image displacement.

Once the desired image containers 81–84 are displayed, the cursor 90 will be placed over the image to be moved, and the mouse will be used to drag and drop the image. FIG. 2a shows cursor 90 in the dragging operation, which is evidenced by special icon 290 associated with cursor 90. In the example of FIG. 2, image A from container 81 is dragged and dropped over the top of container 82 which is displaying image B. Once image A is dropped into container 82, image B is moved into container 81, as is shown in FIG. 2b.

Figure 3:
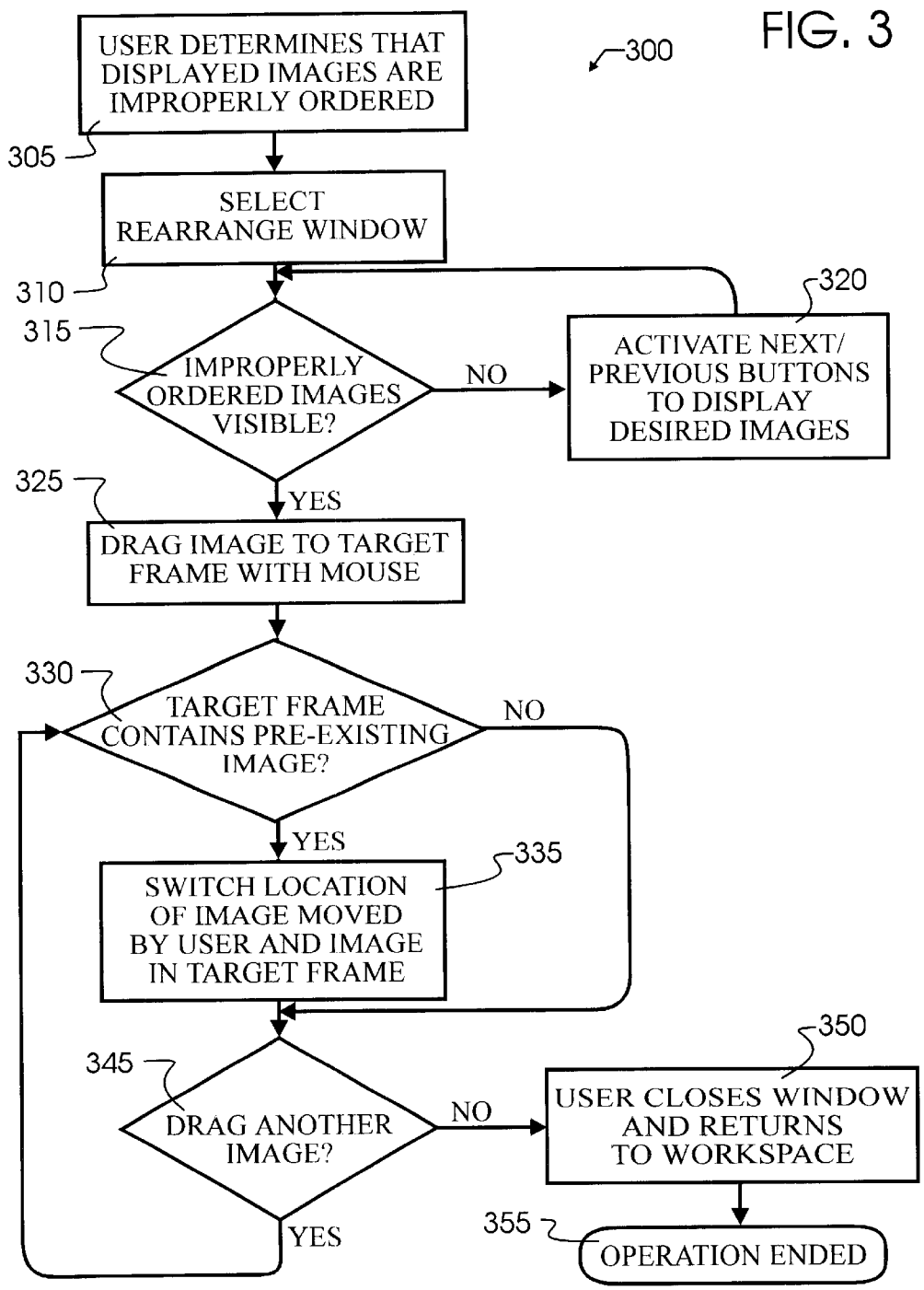
FIG. 3 illustrates the general steps of the preferred embodiment rearrangement method in accord with the invention.

FIG. 3 illustrates the image shift method 300 of the present invention in greater detail. Image shift method 300 is initiated at step 305 when a technologist or other operator determines that the images as they are displayed are improperly ordered. In step 310, the rearrange window is selected. As aforementioned, in the preferred embodiment this is accomplished by clicking while cursor 90 is over rearrange button 108. This initiates the rearrange window similar to that shown in FIG. 2a, except that cursor 90 will at this time most preferably still be the standard cursor, such as an arrowhead. If the improperly ordered images are not within display screen 30 at step 315, then at step 320 the single image backward and forward buttons 110 and 112 are activated, until the improperly ordered images are visible at step 315.

According to the preferred method 300, once the improperly ordered images are visible at step 315, a single image is then dragged with the mouse to a target image container, where the image is dropped by the operator. FIG. 2a illustrates image A being dragged towards image container 82. Next, the target image container is checked to determine whether an image is already contained therein. If there is no image, then no rearrangement of the images will occur. The process will proceed to step 345, where the system will check for the operator dragging another image. If, instead at step 330 there is an image in the target image container, then the two images are switched. In FIGS. 2a and 2b, the target container is in image container 82, and in image A is dropped therein. Since image B is already there, then according to method 300 image B will be switched with image A at step 335. According to the preferred embodiment method, the process flow will then proceed to step 345 to determine whether the operator drags another image.

The image shift method can be repeated to rearrange multiple images, merely by dragging and dropping additional images at steps 330–345. When the images are rearranged, then at step 350 the user will most preferably close the rearrange display 210 at step 350 by clicking on the restore window button 118. Button 118 is visible at the bottom of rearrange display 210. This will then end the rearrange operation, as shown at step 355.

Once the rearrange operation is completed at step 355, the apparatus of the invention will most preferably change the information stored about the individual images to reflect the correct order. This will most preferably include updating a DICOM field known as image number. When the images are examined by a receiving diagnostic workstation, the image number field from the DICOM standards will allow the receiving station to display the images in the order set by the technologist.

While the foregoing details what is felt to be the preferred embodiment of the invention, no material limitations to the scope of the claimed invention are intended. Further, features and design alternatives that would be obvious to one of ordinary skill in the art are considered to be incorporated herein. For example, activating signals may be received as mouse clicks or double clicks from either left or right mouse buttons, or from other input devices or other buttons as may be created or provided for during design of an apparatus in accord with the disclosure and teachings of the present invention. The critical factor is that the event be separately monitored and discernable from the cursor position. The mouse input is a preferred embodiment, since single hand control, standard hardware and easy familiarity are all benefits thereof. Other variations are contemplated for the invention and would be obvious to those of ordinary skill in the art, such as any of a multitude of different icon and cursor designs and shapes. With this in mind, the scope of the invention is set forth and particularly described in the claims hereinbelow.

What is claimed is:

1. A computerized apparatus for displaying radiological anatomical data in the form of images that vary in type and preferred display formats which allows an operator to stay visually focused on a display monitor where said images are displayed, and also provides said operator with a maximum display area for said images, comprising:

a first one of said images having a first data field;

a second one of said images having a second data field;

a display monitor screen with a first graphical container and a second graphical container therein where said first and second ones of said images may be respectively displayed in a first sequential order determined by said first and second data fields;

a cursor indicating a pointer position on said display monitor screen, said pointer position variable and controlled by an operator input device;

a rearrange control region within said display monitor screen which responds to said pointer position and an additional operator input to activate a rearrange display within said display monitor screen; and said cursor responsive to said rearrange display and said operator input device to select an image from said first graphical container responsive to a first operator input and to drop said selected image into said second graphical container responsive to a second operator input, said first and second data fields determining a second sequential order different from said first sequential order responsive to said selected image drop.

2. The computerized apparatus for displaying radiological anatomical data of claim 1, wherein said first operator input is a left mouse button down signal accompanied by a mouse movement.

3. The computerized apparatus for displaying radiological anatomical data of claim 2, wherein said cursor further comprises an additional icon representing an activation of said first operator input.

4. The computerized apparatus for displaying radiological anatomical data of claim 1, wherein said second graphical container is checked for a presence of said second one of said images prior to displaying said first one of said images.

5. The computerized apparatus for displaying radiological anatomical data of claim 4, wherein said second one of said images is moved to said first graphical container responsive to said dropping of said first one of said images into said second graphical container.

6. The computerized apparatus for displaying radiological anatomical data of claim 1, wherein said first and second graphical containers are enlarged responsive to said activation of said rearrange display.

7. The computerized apparatus for displaying radiological anatomical data of claim 1, further comprising:

a first sequence value associated with said first data field prior to said selected image drop and associated with said second data field subsequent to said selected image drop; and a second sequence value associated with said second data field prior to said selected image drop and associated with said first data field subsequent to said selected image drop.

8. The computerized apparatus for displaying radiological anatomical data of claim 1, wherein said first and second data fields further comprise DICOM (Digital Imaging and Communications in Medicine) standard image number fields.

9. A method for displaying and rearranging a variable number of radiological images on a computer screen where a user may directly activate common functions and capabilities without accessing additional screen pages or pull down menus, and wherein images may shifted from a first viewing order to a second viewing order for subsequent viewing sessions different from said first viewing order, comprising the steps of:

defining a first image display region within said screen;

displaying a first image within said first image display region;

assigning a first data item to said first image representative of a sequence position in said first viewing order;

presenting a rearrangement button within said screen;

indicating a cursor position on said screen;

monitoring a cursor control input device for signals indicative of a change in desired cursor position;

calculating said cursor position based upon said signals indicative of a change in desired cursor position;

determining whether said cursor position and said rearrangement button overlap;

monitoring said cursor control input device for a signal indicative of cursor activation;

displaying a second image display region;

enabling a drag-and-drop movement of said first image from said first image display region to said second image display region subsequent to when said step of determining yields overlap and said step of monitoring cursor activation yields said signal indicative of cursor activation to yield said second viewing order; and assigning a second data item to said first image representative of a sequence position in said second viewing order responsive to said enabling step.

10. The method for displaying a variable number of radiological images on a computer screen of claim 9, wherein said step of displaying further comprises displaying an outline on said screen which delineates regions where said variable number of radiological images will be displayed.

11. The method for displaying a variable number of radiological images on a computer screen of claim 9, further comprising an image sequencing button for sequentially displaying said images within said first image display region.

12. The method for displaying a variable number of radiological images on a computer screen of claim 9, wherein said step of assigning said second data item further comprises altering a DICOM (Digital Imaging and Communications in Medicine) standard image sequence data field associated with said radiological images.

13. A radiological image display apparatus for displaying at least one stored image sequence which closely emulates actions required of a technologist in arranging film images on a view board by having direct and within the image cursor activation of view board functions and capabilities, comprising the combination of:

a display screen having icons thereon;

a plurality of radiological image containers within said display screen for displaying said at least one stored image sequence in a first sequential pattern;

a designator of said first sequential pattern;

a selection button within said display screen for enabling a cursor image sequence rearrangement function while simultaneously disabling other cursor control functions, said rearrangement function processing said at least one stored image sequence to generate a second sequential pattern different from said first sequential pattern; and a designator of said second sequential pattern stored in association with said at least one stored image sequence;

whereby said at least one stored image sequence may be readily rearranged within each of said plurality of containers while not disturbing or altering other image functions, until said cursor image sequence rearrangement function has been completed, and said second sequential pattern sequence is preserved through said second sequential pattern designator, wherein said display apparatus closely emulates a film exposure, manipulation thereof on a light board, sequence rearrangement, and subsequent stacking in rearranged order by medical personnel.

14. The radiological image display apparatus of claim 13, further comprising a means for filling said display screen with a first two of said plurality of radiological images responsive to said enabling of said cursor image sequence rearrangement function.

15. The radiological image display apparatus of claim 14, further comprising a means for disabling said cursor image sequence rearrangement function while simultaneously enabling said other cursor control functions.

16. The radiological image display apparatus of claim 13, wherein said image sequence rearrangement comprises a mouse drag and drop.

17. The radiological image display apparatus of claim 13, wherein said second sequential pattern designator further comprises DICOM (Digital Imaging and Communications in Medicine) standard image number fields.

* * * * *